United States Patent [19]

Nowlin et al.

[11] 4,291,245

[45] Sep. 22, 1981

[54] ELECTRETS

[75] Inventors: Thomas E. Nowlin, Somerset, N.J.; Curt R. Raschke, Dallas, Tex.

[73] Assignee: Union Carbide Corporation, New York, N.Y.

[21] Appl. No.: 72,303

[22] Filed: Sep. 4, 1979

[51] Int. Cl.³ ............................................. G11C 13/02
[52] U.S. Cl. ........................................ 307/400; 264/81; 264/104; 427/35; 427/41; 427/58; 427/70; 427/100; 427/248.1; 427/255.6; 427/295; 427/350; 428/457; 428/461; 428/900; 428/913; 428/929; 428/934; 428/938
[58] Field of Search .................. 29/25, 42; 361/271, 361/275; 307/400; 427/248.1

[56] References Cited

U.S. PATENT DOCUMENTS

| | | | |
|---|---|---|---|
| 3,246,627 | 4/1966 | Loeb et al. | 118/726 |
| 3,301,707 | 1/1967 | Loeb et al. | 428/457 X |
| 3,421,930 | 1/1969 | Knox et al. | 427/41 |
| 3,600,216 | 8/1971 | Stewart | 428/447 X |
| 3,663,265 | 5/1972 | Lee et al. | 427/41 |
| 3,956,525 | 5/1976 | Yasuba | 427/41 |
| 4,018,945 | 4/1977 | Mehalso | 427/41 |
| 4,047,998 | 9/1977 | Yoshikawa et al. | 307/400 X |
| 4,054,680 | 10/1977 | Sharbaugh | 427/41 X |
| 4,086,499 | 4/1978 | Mishra | 307/400 |
| 4,123,308 | 10/1978 | Nowlin et al. | 427/41 |
| 4,186,164 | 1/1980 | Spivack | 264/81 |

*Primary Examiner*—Thomas J. Herbert, Jr.
*Attorney, Agent, or Firm*—Frederick J. McCarthy, Jr.

[57] ABSTRACT

A process for preparing polymer electrets comprising the following steps:

(a) providing a parylene film having one side affixed to a metal layer and grounding said metal layer;

(b) charging the free side of the film with a direct current corona, the charge being of sufficient magnitude to convert the film to an electret;

(c) providing p-xylylene monomer vapor in sufficient amount to coat the charged film; and (d) introducing the vapor from step (c) and the electret into a deposition zone, said zone being under vacuum and at a temperature at which the vapor will condense, whereby the electret is conformally coated with parylene.

6 Claims, No Drawings

ELECTRETS

FIELD OF THE INVENTION

This invention relates to parylene electrets and a process for making same.

Description of the Prior Art

Electrets may be considered the electrical analog of permanent magnets. While magnets are a collection of aligned magnetic dipoles, electrets are materials containing aligned electric dipoles (or their equivalent, equal but opposite charges on opposing surfaces). Both produce permanent external fields, magnetic in one case and electric in the other. As might be expected, electrets have found commercial application in numerous devices such as microphones, speakers, radiation detectors, and dosimeters, and in electrophotography.

Commercial electrets are divided into two broad types, those made from inorganic materials having relatively high sensitivites and use temperatures, but having relatively small surface areas and being expensive to manufacture, and those made from organic materials having relatively medium sensitivities and large surface areas, and capable of being produced as thin films inexpensively. It is understandable, then, that where the commercial application lends itself to the use of organic materials, for example, when high sensitivity can be sacrificed or thin films are a prerequisite, the organic materials will be selected, particularly because of their much lower cost. While, theoretically, any polymer which can be used as a dielectric can be made into an electret, there are few which have sufficiently stable polarization to be converted into an electret having an acceptable longevity. One such polymer is polytetrafluoroethylene, which is preferably made into an electret by charge injection. Unfortunately, electrets prepared by charge injection have a vulnerable surface charge, which is subject to degradation by environmental conditions such as dust and humidity. Charge injection via electron beam was suggested to overcome this problem because it implants the charge below the surface thus reducing environmental degradation somewhat. However, not only does the electron beam charge injection not eliminate degradation, but it requires a vacuum and cannot easily charge other than flat sheets, which generally cannot be fabricated into other configurations without degrading the electret.

SUMMARY OF THE INVENTION

An object of this invention, therefore, is to provide a method for making polymer electrets by charge injection whereby the surface charge is essentially not degraded and yet the charge injection technique is such that it does not need a vacuum and can easily charge other than flat surfaces, and whereby the resultant electret has high sensitivity and high frequency response.

Other objects and advantages will become apparent hereinafter.

According to the present invention such a method for making polymer electrets has been discovered comprising the following steps:

(a) providing a parylene film having one side affixed to a metal layer and grounding said metal layer;

(b) charging the free side of the film with a direct current corona, the charge being of sufficient magnitude to convert the film to an electret;

(c) providing p-xylylene monomer vapor in sufficient amount to coat the charged film; and (d) introducing the vapor from step (c) and the electret into a deposition zone, said zone being under vacuum and at a temperature at which the vapor will condense, whereby the electret is conformally coated with parylene.

The electret produced by the process comprises, in combination, (i) a metal layer coated with a film of parylene, said parylene film having a surface charge, (ii) an external electric field, and (iii) a conformal parylene overcoat on the charged surface.

DESCRIPTION OF THE PREFERRED EMBODIMENT

Parylene is well known as a conformal coating used primarily in the electronics industry. It is unique as a coating because of its ability to provide ultra-thin films and conform to substrates of varied geometrical shapes and irregularities. Parylene also has excellent chemical resistance and can be used at relatively high temperatures. Another unusual characteristic of parylene is the method by which the coating is formed.

Parylene is a generic term applied to the family of unsubstituted and substituted poly-p-xylylenes. The polymers can be homopolymers or co-polymers depending on whether they are derived from one particular dimer or a mixture f different dimers. The unsubstituted homopolymer poly-p-xylylene has the structure

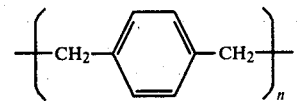

and substituted homopolymers may be illustrated by the following structures:

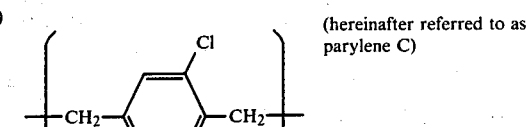

(hereinafter referred to as parylene C)

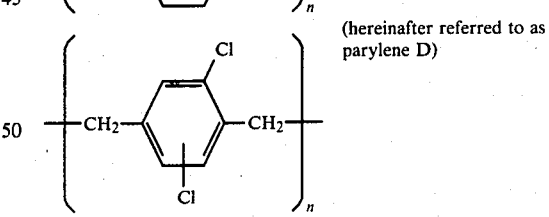

(hereinafter referred to as parylene D)

The substituent can be any organic or inorganic group, which can normally be substituted on aromatic nuclei provided that the dimer and monomer are vaporizable under process conditions. Examples of substituents are the halogens, and cyano groups, e.g., cyanoparylene and dicyanoparylene. Fluorine atoms or other substituents can be substituted for the hydrogen atoms in the methylene groups, if desired.

A description of parylene, processes for making it, and the apparatus in which parylene deposition can be effected may be found in U.S. Pat. Nos. 3,246,627; 3,301,707; and 3,600,216, all of which patents are incorporated by reference herein. It will be observed, however, that the term "parylene" is not used in these patents. Instead, the term poly-p-xylylene is used generically and this term is considered to include both the unsubstituted and substituted varieties in the form of homopolymers or copolymers just as the term parylene in this specification.

The process for coating a substrate with parylene is conventional. Typical steps and conditions of such a process involve first vaporizing a cyclic dimer which contains the desired repeating unit, e.g., cyclic di-p-xylylene, at a pressure of about 10 to about 100 microns and at a temperature of about 150° C. to about 200° C.; then, pyrolyzing the vaporized cyclic dimer at slightly lower pressure at about 670° C. to about 690° C., the pyrolysis step breaking the benzylic carbon to carbon bonds to provide the p-xylylene monomer in the vapor state; and, finally, introducing the vaporous monomer into a deposition chamber containing the substrate, at still slightly lower pressure, but at ambient temperatures in the range of about 20° C. to about 30° C., whereby the monomer condenses and polymerizes on all of the exposed surface of the substrate to provide a thin parylene film. There is a slight pressure gradient established throughout the process, the pressure progressively getting lower in each stage. This pressure differential drives the vapor from one stage of the process to the next.

The apparatus used typically comprises a vaporized or sublimator section, a pyrolysis zone, and a deposition chamber, all connected by tubing, with the deposition chamber having a valved outlet connected to a pump for providing the required pressure. Heating means for vaporization and pyrolysis are provided while condensation is effected by ambient temperature.

The same process, apparatus, and dimer are used here to prepare the parylene film used in step (a), the metal layer being the substrate used in the deposition. The thickness of the film is limited to that needed to provide the electret voltage useful for the application and is generally about 2 to about 200 microns. Since the voltage developed across the film is directly proportional to the thickness of the film and its equivalent charge density, and electret applications utilize the voltage drop across the film, the requisite thickness can be ascertained by the following formula:

$$V = \frac{ST}{KE_o}$$

wherein
V = voltage drop across film
S = equivalent surface charge density (charge/area)
T = thickness of film
K = dielectric constant of film
$E_o$ = permativity of free space The metal layer (electrode) is then grounded and the free (or other) side of the parylene film is uniformly charged, positively or negatively, to its maximum electric charge acceptance with a direct current corona, which may be constructed by suspending a thin wire above the film and applying a high voltage, e.g., 8 kilovolts, either positive or negative (but not both), to the wire to cause air to break down and deposit charged ions on the surface of the film. Since the corona can easily charge irregular surfaces, i.e., surfaces which are not flat, the parylene film and substrate can have almost any configuration. The parylene electret including the film and metal substrate is then placed in a deposition chamber where it is conventionally coated as described above with parylene. The thickness of the parylene overcoat is about 0.1 to about 10 microns. A metal overcoat can be deposited on top of the parylene overcoat if another electrode is desired.

The invention is illustrated by the following examples:

EXAMPLE 1

Two films of parylene C having a thickness of 17 microns are deposited, each on a separate aluminum foil substrate, in the conventional manner described above. The aluminum layers are grounded and the free sides of the films are then uniformly charged, one positively and one negatively, to their maximum electric charge acceptance with a direct current corona, as described above, to provide electrets. Surface charge densities and voltages are measured by conventional means. The charged films are then overcoated with parylene, again as described above. Voltages are measured as before.

It is determined that the electrets have acceptable surface charge, voltage, and longevity along with high sensitivity and frequency response.

EXAMPLE 2

Example 1 is repeated except that 7.8 microns of parylene are coated onto a 50 mesh aluminum screen. Similar results are obtained as in Example 1 indicating that subject process can be applied to parylene films and substrates of complicated configuration.

I claim:

1. A process for preparing polymer electrets comprising the following steps:
   (a) providing a parylene film having one side affixed to a metal layer and grounding said metal layer;
   (b) charging the free side of the film with a direct current corona, the charge being of sufficient magnitude to convert the film to an electret;
   (c) providing a p-xylylene monomer vapor in sufficient amount to coat the charged film; and
   (d) introducing the vapor from step (c) and the electret into a deposition zone, said zone being under vacuum and at a temperature at which the vapor will condense, whereby the electret is conformally coated with parylene.

2. The process defined in claim 1 wherein the parylene used in step (a) has chloro, dichloro, cyano, or dicyano substituents.

3. The process defined in claim 1 wherein fluorine atoms are substituted for the hydrogen atoms of the methylene groups in the parylene film or monomer.

4. An electret comprising, in combination, (i) a metal layer coated with a film of parylene, said parylene film having a surface charge; (ii) an external electric field; and (iii) a conformal parylene overcoat on the charged surface.

5. The electret defined in claim 4 wherein the parylene has chloro, dichloro, cyano, or dicyano substiuents.

6. The electret defined in claim 4 wherein fluorine atoms are substituted for the hydrogen atoms of the methylene groups in the parylene film or overcoat.

* * * * *